(12) United States Patent
Xie et al.

(10) Patent No.: US 8,374,153 B2
(45) Date of Patent: Feb. 12, 2013

(54) FACILITATING MOBILITY BETWEEN MULTIPLE COMMUNICATION NETWORKS

(75) Inventors: Qiaobing Xie, South Barrington, IL (US); Anand S. Bedekar, Arlington Heights, IL (US); Suresh Kalyanasundaram, Bangalore (IN)

(73) Assignee: Motorola Mobility LLC, Libertyville, IL (US)

( * ) Notice: Subject to any disclaimer, the term of this patent is extended or adjusted under 35 U.S.C. 154(b) by 856 days.

(21) Appl. No.: 12/099,198

(22) Filed: Apr. 8, 2008

(65) Prior Publication Data

US 2008/0279153 A1    Nov. 13, 2008

(51) Int. Cl.
*H04W 4/00* (2009.01)
*H04W 24/00* (2009.01)
*G06F 15/16* (2006.01)
(52) U.S. Cl. ........ 370/332; 370/229; 370/328; 370/329; 709/217; 709/218; 455/456
(58) Field of Classification Search .................. None
See application file for complete search history.

(56) References Cited

U.S. PATENT DOCUMENTS

| | | | |
|---|---|---|---|
| 2003/0229695 A1* | 12/2003 | Mc Bride | 709/224 |
| 2006/0187858 A1* | 8/2006 | Kenichi et al. | 370/254 |
| 2007/0110009 A1* | 5/2007 | Bachmann et al. | 370/338 |
| 2007/0207816 A1* | 9/2007 | Spain | 455/456.1 |
| 2008/0020792 A1* | 1/2008 | Falk et al. | 455/517 |
| 2010/0034166 A1* | 2/2010 | Olvera-Hernandez | 370/331 |
| 2010/0317362 A1* | 12/2010 | Lee et al. | 455/452.1 |

* cited by examiner

*Primary Examiner* — Nittaya Juntima
*Assistant Examiner* — Samina Choudhry

(57) ABSTRACT

Various embodiments are described to enable improved inter-network/inter-technology handover of mobile devices. A network device (131, 132) collects dynamic information corresponding to mobile devices (101, 102), such as wireless measurement information at the device's location, and/or information corresponding to wireless network nodes (121-124), such loading levels/loading distributions. The network device then sends some or all of the dynamic information collected and/or statistical information generated from the dynamic information collected to a neighboring network information server (150) for access by other communication networks. By maintaining dynamic and/or statistical information in a neighboring network information server, such information can be made available to all the communication networks in a given region. One potential benefit to making this information available is improved inter-network handoff decision-making.

12 Claims, 5 Drawing Sheets

US 8,374,153 B2

FACILITATING MOBILITY BETWEEN MULTIPLE COMMUNICATION NETWORKS

REFERENCE(S) TO RELATED APPLICATION(S)

The present application claims priority from an Indian patent application, having Application No. 976/DEL/2007, entitled "FACILITATING MOBILITY BETWEEN MULTIPLE COMMUNICATION NETWORKS," filed May 7, 2007, which is commonly owned and incorporated herein by reference in its entirety.

FIELD OF THE INVENTION

The present invention relates generally to communication systems and, in particular, to facilitating mobility between different wireless communication networks.

BACKGROUND OF THE INVENTION

Mobile devices with multi-technology radio interfaces (a.k.a., multi-modal terminals) are emerging. It is widely expected that multi-modal mobile terminals will soon allow handover of active sessions from one access network to another (i.e., an inter-technology handover). Standards for supporting seamless inter-technology handover of multi-modal mobile terminals have been under development in, e.g., 3GPP, 3GPP2, WiMax, and IEEE802. And a key component proposed in the standards for enabling seamless inter-technology handover is a technology independent (a.k.a., a media independent) handover information service that can provide neighboring network information for a given location to a handover decision engine located in either the terminal or the network. At the present, neighboring network information service proposals include configured/provisioned information, such as the network type, operation IDs, designed capability, policy of access networks available in the area, the owner and service specifics of each available network, and the specifics of each Access Point (AP) or Base Station (BS) of each available network. However, in view of the ongoing work in this area, new techniques able to improve the inter-technology handover by multi-modal mobile terminals are clearly desirable for advancing the art.

Specific embodiments of the present invention are disclosed below with reference to FIGS. 1-5. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved. In addition, although the signaling flow diagrams and/or the logic flow diagrams above are described and shown with reference to specific signaling exchanged and/or specific functionality performed in a specific order, some of the signaling/functionality may be omitted or some of the signaling/functionality may be combined, sub-divided, or reordered without departing from the scope of the claims. Thus, unless specifically indicated, the order and grouping of the signaling/functionality depicted is not a limitation of other embodiments that may lie within the scope of the claims.

Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

DETAILED DESCRIPTION OF EMBODIMENTS

Various embodiments are described to enable improved inter-network/inter-technology handover of mobile devices. A network device collects dynamic information corresponding to mobile devices, such as wireless measurement information at the device's location, and/or information corresponding to wireless network nodes, such loading levels/loading distributions. The network device then sends some or all of the dynamic information collected and/or statistical information generated from the dynamic information collected to a neighboring network information server for access by other communication networks. By maintaining dynamic and/or statistical information in a neighboring network information server, such information can be made available to all the communication networks in a given region. One potential benefit to making this information available is improved inter-network handoff decision-making.

Figure 1:
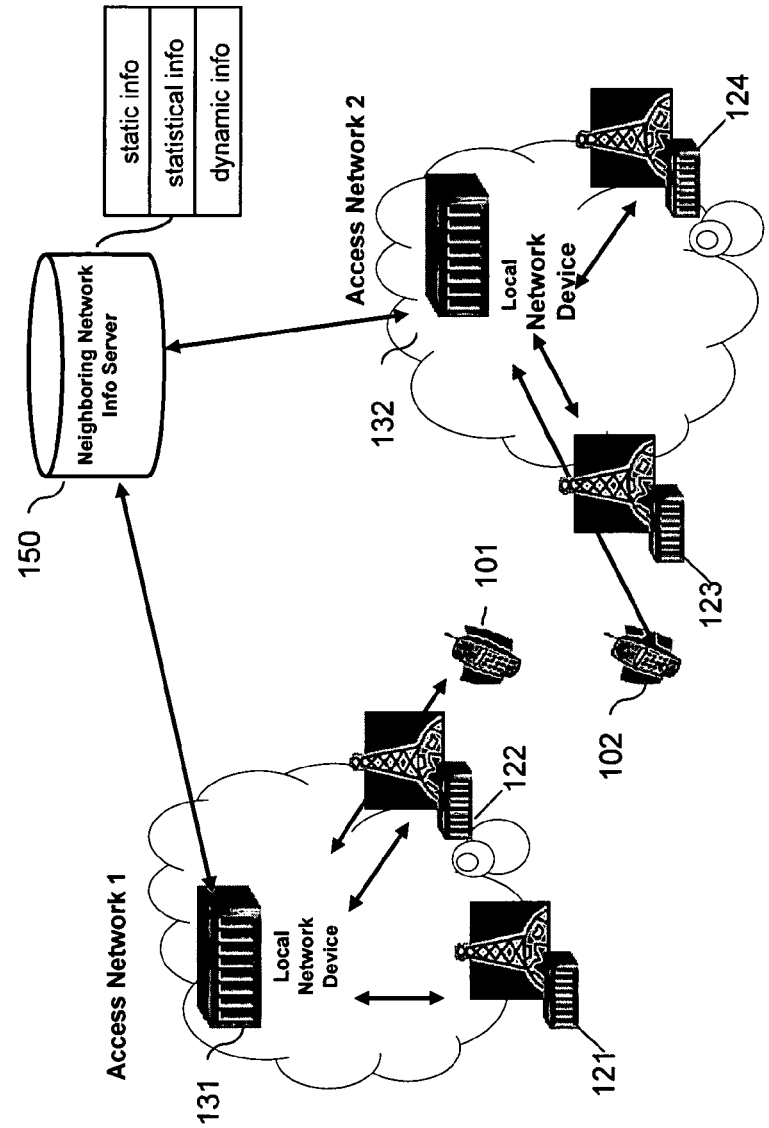
FIG. 1 is a block diagram depiction of a wireless communication system in accordance with multiple embodiments of the present invention.

The disclosed embodiments can be more fully understood with reference to FIGS. 1-5. FIG. 1 is a block diagram depiction of a wireless communication system 100 in accordance with multiple embodiments of the present invention. At present, standards bodies such as OMA (Open Mobile Alliance), 3GPP (3rd Generation Partnership Project), 3GPP2 (3rd Generation Partnership Project 2), IEEE (Institute of Electrical and Electronics Engineers) 802, and WiMAX Forum are developing standards specifications for wireless telecommunications systems. (These groups may be contacted via http://www.openmobilealliance.com, http://www.3gpp.org/, http://www.3gpp2.com/, http://www.ieee802.org/, and http://www.wimaxforum.org/ respectively.) Communication system 100 represents a system having an architecture in accordance with one or more of the WiMAX Forum and/or IEEE 802 technologies, suitably modified to implement the present invention. Alternative embodiments of the present invention may be implemented in communication systems that employ other or additional technologies such as, but not limited to, those described in the OMA, 3GPP, and/or 3GPP2 specifications.

Communication system 100 is depicted in a very generalized manner. For example, system 100 is shown to simply include two different communication networks, one being access network 1 (depicted by network components 121, 122 and 131) and the other being access network 2 (depicted by network components 123, 124 and 132). Network devices 131 and 132 are shown interfacing with neighboring network information server 150 and respectively with network nodes 121 and 122 and with network nodes 123 and 124. Network nodes 122 and 123 are shown providing network service to mobile devices 101 and 102 using wireless interfaces. The wireless interfaces used are in accordance with the particular access technology supported by each respective network node. For example, they may all utilize the same technology such as one based on IEEE 802.16, or they may utilize different access technologies. Those skilled in the art will recognize that FIG. 1 does not depict all of the physical fixed network components that may be necessary for system 100 to operate but only those system components and logical entities particularly relevant to the description of embodiments herein.

For example, FIG. 1 does not depict that network nodes 121-124, network devices 131 and 132, and neighboring network information server 150 each comprise processing units and network interfaces. Additionally, network nodes 121-124 each comprise wireless transceivers. In general, components such as processing units, transceivers and network interfaces are well-known. For example, processing units are known to comprise basic components such as, but neither limited to nor necessarily requiring, microprocessors, microcontrollers, memory devices, application-specific integrated circuits (ASICs), and/or logic circuitry. Such components are typically adapted to implement algorithms and/or protocols that have been expressed using high-level design languages or descriptions, expressed using computer instructions, expressed using signaling flow diagrams, and/or expressed using logic flow diagrams.

Thus, given a high-level description, an algorithm, a logic flow, a messaging/signaling flow, and/or a protocol specification, those skilled in the art are aware of the many design and development techniques available to implement a processing unit that performs the given logic. Therefore, devices 121-124, 131, 132, and 150 represent known devices that have been adapted, in accordance with the description herein, to implement multiple embodiments of the present invention. Furthermore, those skilled in the art will recognize that aspects of the present invention may be implemented in or across various physical components and none are necessarily limited to single platform implementations. For example, a network node may be implemented in or across one or more RAN components, such as a base transceiver station (BTS) and/or a base station controller (BSC), a Node-B and/or a radio network controller (RNC), or an HRPD AN and/or PCF, or implemented in or across one or more access network (AN) components, such as an access service network (ASN) gateway and/or ASN base station (BS), an access point (AP), a wideband base station (WBS), and/or a WLAN (wireless local area network) station. Likewise, any of network devices 131 and 132 and neighboring network information server 150 may be implemented in or across various physical components, such as network server devices, and none are necessarily limited to single platform implementations.

Mobile devices 101 and 102 and network nodes 122 and 123 are shown communicating via technology-dependent, wireless interfaces. Mobile devices, remote units, subscriber stations (SSs) and/or user equipment (UEs), may be thought of as mobile stations (MSs), mobile subscriber stations (MSSs) or mobile nodes (MNs). In addition, mobile device platforms are known to refer to a wide variety of consumer electronic platforms such as, but not limited to, mobile stations (MSs), access terminals (ATs), terminal equipment, remote units, gaming devices, personal computers, and personal digital assistants (PDAs). In particular, mobile devices 101 and 102 each comprise a processing unit (not shown) and transceiver (not shown). Depending on the embodiment, any of mobile devices 101 and 102 may additionally comprise a keypad (not shown), a speaker (not shown), a microphone (not shown), and a display (not shown). Processing units, transceivers, keypads, speakers, microphones, and displays as used in remote units are all well-known in the art.

Operation of embodiments in accordance with the present invention occurs substantially as follows, first with reference to FIG. 1. As depicted in FIG. 1, each access network has a local network device, devices 131 and 132. Although only one is depicted in each network, other access network embodiments may include multiple local network devices or single local network devices that are physically distributed across multiple device platforms. Both devices 131 and 132, and therefore both access networks, interface with neighboring network information server 150. Although only one neighboring network information server is depicted, other embodiments may include multiple neighboring network information servers or a single neighboring network information server that is physically distributed across multiple server platforms.

Figure 5:
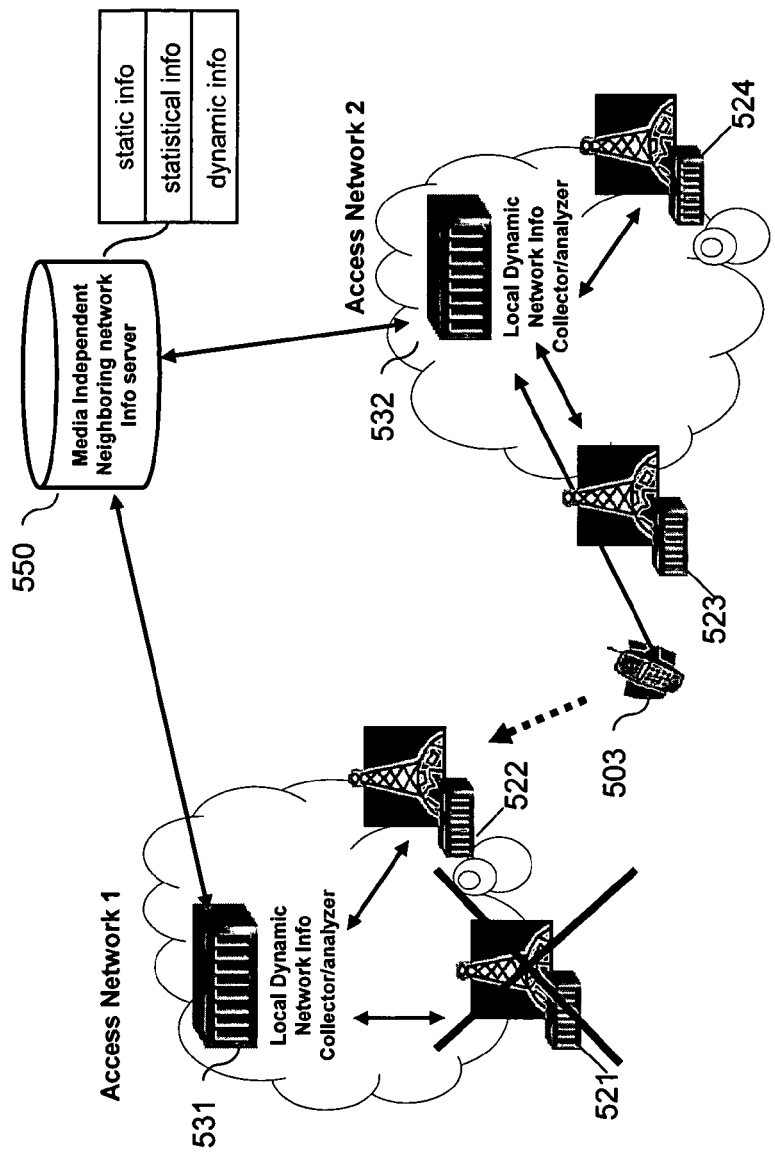
FIG. 5 is a block diagram depiction of a wireless communication system in accordance with a more specific embodiment of the present invention.

FIG. 5 depicts a more specific embodiment of communication system 100, for example. In wireless communication system 500, a media independent neighboring network information server (MIIS) 550 performs the functionality described with respect to neighboring network information server 150, while local dynamic network information collectors/analyzers 531 and 532 perform the functionality described with respect to network devices 131 and 132.

As depicted in FIG. 1, network devices 131 and 132 collect dynamic information corresponding to mobile devices 101 and 102 at different times during the operation of the access networks. Although only mobile devices 101 and 102 are depicted, in a fully loaded system network nodes 121-124 would be serving many mobiles, regarding which, devices 131 and 132 may collect dynamic information. The dynamic information may be collected from the mobile devices individually and/or from the network nodes serving them. For example, network device 131 may collect dynamic information corresponding to mobile device 101 from mobile device 101 itself or from network node 122.

In general, the dynamic information includes wireless measurement information corresponding to a mobile device location. The wireless measurement information may be measurements made by the mobile device or a network node. For example, in some embodiments, the mobile makes wireless signal strength and/or signal quality measurements of neighboring network nodes. Depending on the embodiment, the mobile may also report throughput measurements corresponding to one or more network nodes. For example, mobile device 101 may measure the signal strength of network nodes 121-124 from a particular location. Such measurements may be especially useful when mobile device 101 is about to begin a handoff process, is in the midst of a handoff process, or has just completed a handoff process. Thus, network device 131 may coordinate the collection of the dynamic information around the time of handoff, perhaps through requests to network node 122 and/or mobile device 101. In some embodiments, the measurements/collection may be triggered by a mobile's handoff activities, by the mobile's location (e.g., entering a designated region between network nodes of interest), and/or by the relative signal strengths (or signal strength trends) of signals that the mobile is measuring.

In some embodiments, the dynamic information may include a loading level or loading distribution that corresponds to one or more wireless network nodes at a particular time or over a particular period of time. For example, network device 131 may collect from network nodes 121 and 122 their instantaneous loading levels or their mean loading levels/loading distributions for a particular duration of time.

Network devices 131 and 132 may also generate statistical information from the dynamic information they collect. There is a great variety of the types of statistical information that may be generated. Some examples include information that indicates a mean wireless signal strength at various locations corresponding to one or more network nodes, information that indicates the variance of wireless signal strength at various locations corresponding to one or more network nodes, a probability distribution function of wireless signal strength at various locations corresponding to one or more network nodes, information that indicates a mean throughput at various locations corresponding to at least one wireless network node, information that indicates the variance of throughput at various locations corresponding to one or more network nodes, a probability distribution function of throughput at various locations corresponding to one or more network nodes, information that indicates a mean wireless signal strength at various times corresponding to one or more network nodes, information that indicates the variance of wireless signal strength at various times corresponding to one or more network nodes, a probability distribution function of wireless signal strength at various times corresponding to one or more network nodes, information that indicates a mean throughput at various times corresponding to one or more network nodes, information that indicates the variance of throughput at various times corresponding to one or more network nodes, a probability distribution function of throughput at various times corresponding to one or more network nodes, information that indicates an average loading level corresponding to one or more network nodes at a given time each day, information that indicates an average loading level corresponding to one or more network nodes at a given time each week, information that indicates an average loading level corresponding to one or more network nodes at a given time each month, information that indicates a mean loading level at various times corresponding to one or more network nodes, information that indicates the variance of loading level at various times corresponding to one or more network nodes, and a probability distribution function of loading level at various times corresponding to one or more network nodes.

Having collected dynamic information and perhaps generated some statistical information, as described above, network devices 131 and 132 send this information to neighboring network information server 150 for access by all the communication networks that interface to server 150. Depending on the embodiment, server 150 may simply store the information that it receives from the network devices for later distribution or it may process the information for incorporation into or for updating its own dynamic system tracking/system modeling database. By maintaining dynamic and/or statistical information in server 150, such information can be made available to all the communication networks in a given region. One potential benefit to making this information available is improved inter-network handoff decision-making.

For example, another mobile device (not shown) being served by access network 1 might benefit from handing off to another network node, perhaps a network node in access network 2. An access network 1 device or the mobile device may query server 150 for information that corresponds to the mobile device location. Depending on the embodiment, server 150 may respond to the query with the dynamic and statistical information that it maintains and which is pertinent to the location provided. For example, server 150 may provide the mean signal strength measurements for network nodes 121-124 that correspond to the location provided. These mean signal strength measurements may be based on the information collected from mobile devices 101 and 102 earlier, for example. Server 150 may also provide an indication of loading levels for network nodes 121-124. Similarly, this information may be based on the information collected from network nodes 121-124 earlier.

There are many different, and embodiment-dependent, ways that server 150 might tailor the information that it provides in response to a query. For example, server 150 may only provide information about network nodes in networks other than the querying network or for network nodes that have sufficiently high historic signal strength/signal quality measurements for the location requested. Also, the time-dependent aspects of the information (such as network node loading levels), may be provided based on historical information that server 150 has corresponding to the same time-of-day, same time-of-the-week, or same-time-of-the-month as the query.

Having received a query response, the access network 1 device and/or the mobile device can now use the information to obtain or facilitate obtaining wireless network access via a neighboring communication network. For example, the information can be used by the mobile device (not shown), served by access network 1, to better select a handover target (such as network node 123 over node 124) in access network 2. Thus, having more dynamic information available at a server accessible by different communication networks can potentially improve inter-network handoff decision-making.

Figure 2:
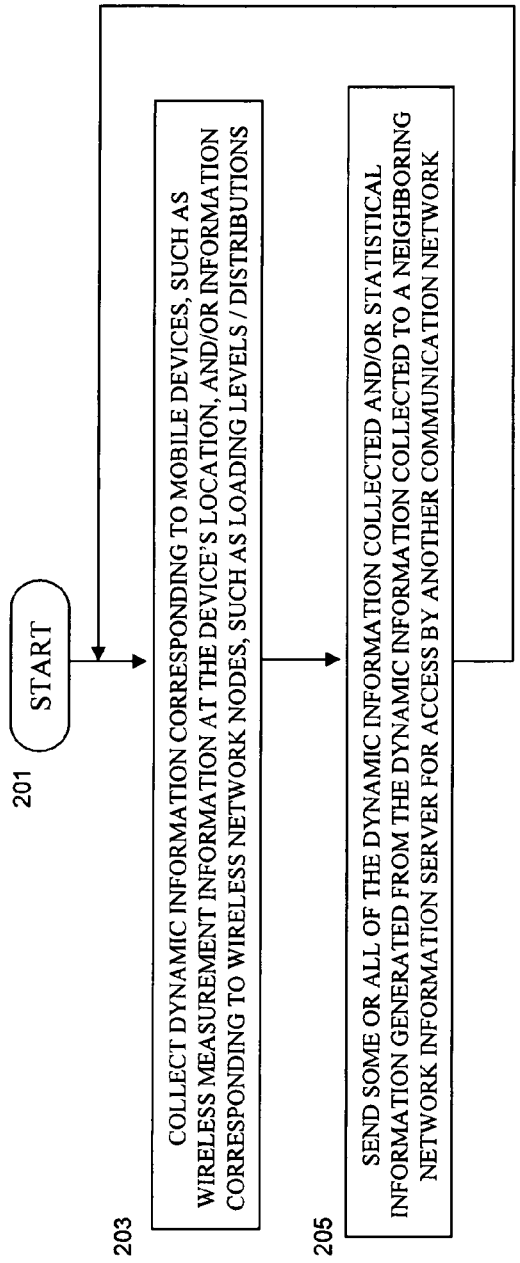
FIG. 2 is a logic flow diagram of functionality performed by a network device in accordance with certain embodiments of the present invention.

FIG. 2 is a logic flow diagram of functionality performed by a network device in accordance with certain embodiments of the present invention. Logic flow 200 begins (201) with a network device collecting (203) dynamic information corresponding to wireless network nodes from the mobile devices, such as wireless measurement information at the device's location, and/or information corresponding to wireless network nodes, such as loading levels/loading distributions. The network device then sends (205) some or all of the dynamic information collected and/or statistical information generated from the dynamic information to a neighboring network information server for access by another communication network. This collecting and sending processes continues in order to keep the information server updated with more recent operational information.

Figure 3:
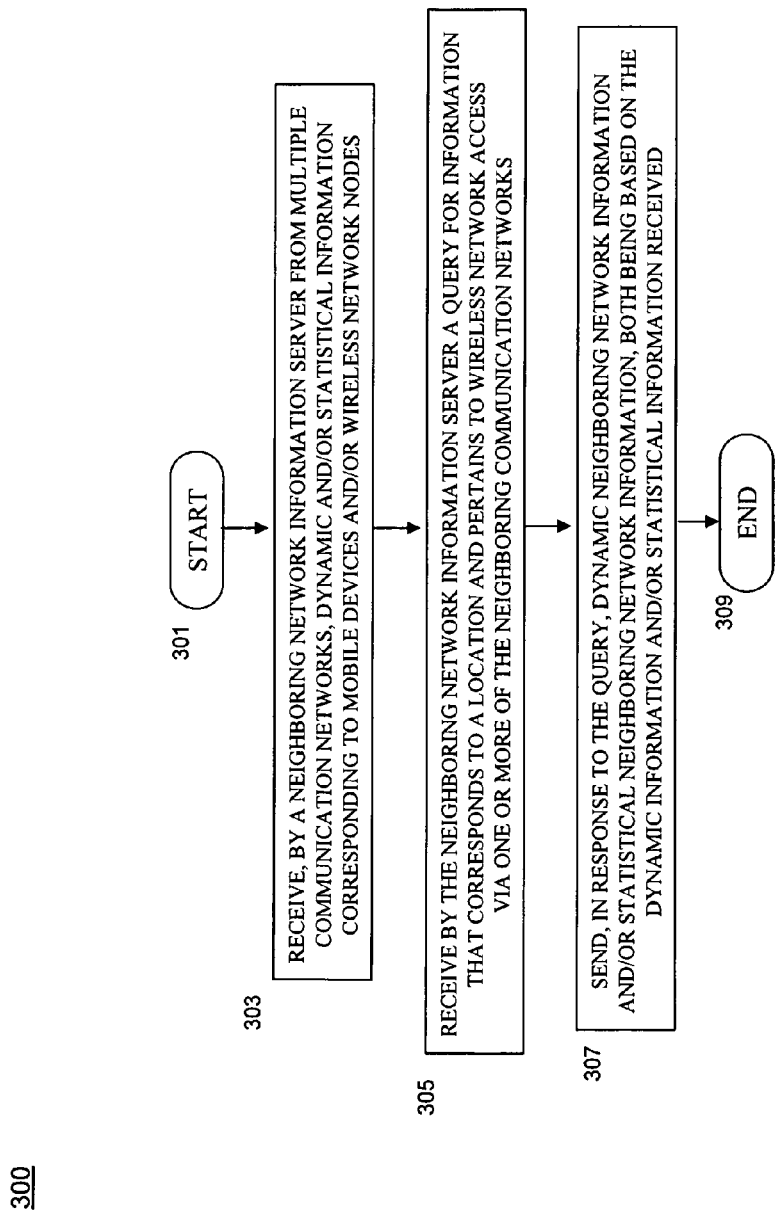
FIG. 3 is a logic flow diagram of functionality performed by a neighboring network information server in accordance with certain other embodiments of the present invention.

FIG. 3 is a logic flow diagram of functionality performed by a neighboring network information server in accordance with certain other embodiments of the present invention. Logic flow 300 begins (301) with a neighboring network information server receiving (303) from multiple communication networks dynamic and/or statistical information corresponding to mobile devices and/or wireless network nodes. At some point, the neighboring network information server receives (305) a query for information that corresponds to a location and pertains to wireless network access via one or more of the neighboring communication networks. In response to the query, the neighboring network information server sends (307) dynamic neighboring network information and/or statistical neighboring network information, both being based on the dynamic information and/or statistical information received. Logic flow 300 thus ends (309); however, in typical operation, a neighboring network information server will continue to receive more recent information and at some point additional queries requiring responses.

Figure 4:
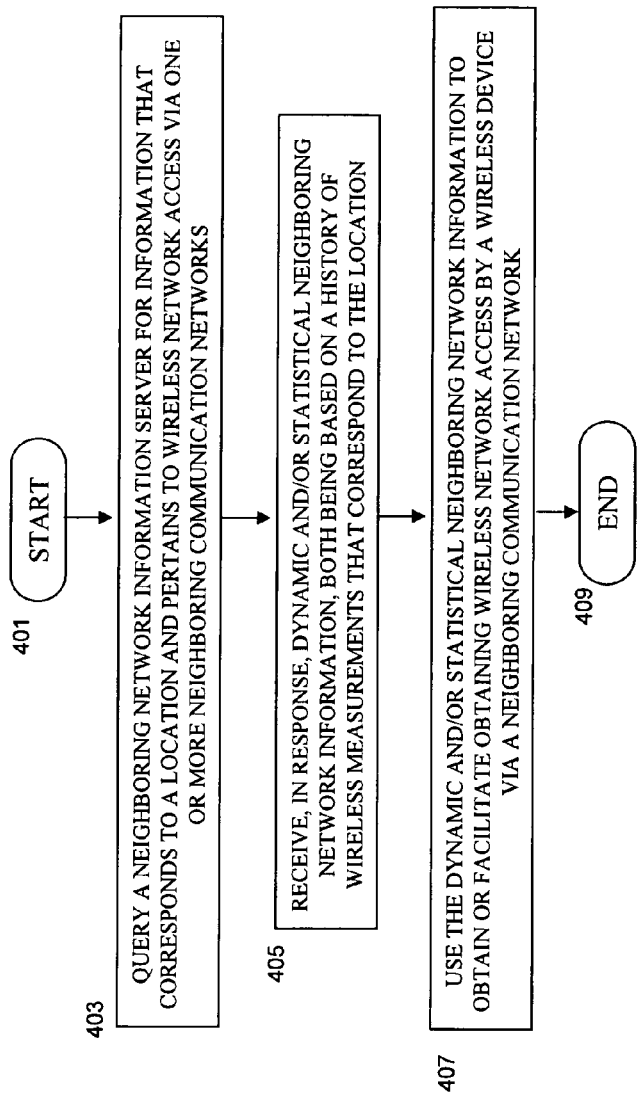
FIG. 4 is a logic flow diagram of functionality performed by a mobile device or one or more network devices in accordance with certain embodiments of the present invention.

FIG. 4 is a logic flow diagram of functionality performed by a mobile device or one or more network devices in accordance with certain embodiments of the present invention. Logic flow 400 begins (401) with a device (such as a mobile device or some network device) querying (403) a neighboring network information server for information that corresponds to a location and pertains to wireless network access via one or more neighboring communication networks. In response, the device receives (405) dynamic and/or statistical neighboring network information, both being based on a history of wireless measurements that correspond to the location. The device may now use (407) the dynamic and/or statistical neighboring network information to obtain or facilitate obtaining wireless network access by a wireless device (such as the querying device) via a neighboring communication network. Logic flow 400 thus ends (409).

While FIGS. 2-4 more generally depict functional aspects of various embodiments of the present invention, it is believed that a more detailed description of particular embodiments will assist the reader in understanding and implementing the more generically described embodiments above. The embodiments described below are provided as examples. They are provided as particular, and quite specific, example embodiments of the present invention. They are intended to further the reader's understanding of the variety of possible embodiments rather than to limit the scope of the invention.

FIG. 5 is a block diagram depiction of a wireless communication system in accordance with more specific embodiments of the present invention. In addition to the brief description of FIG. 5 above are the following points:

The local dynamic network information collector/analyzers 531 and 532 send updates to a media independent handover information server (MIIS) 550.

The dynamic and statistical neighborhood information is used in conjunction with provisioned neighboring network information to refine handover decision making.

Measurements, at various locations, fed back by some mobiles regarding the access points of other technologies, are used to develop a dynamic/statistical model of the characteristics of the access points of other technologies.

Measurements fed back by mobiles can include signal strength, throughput, etc.

Statistical characteristics include:
mean/variance or probability distribution function of the received signal strengths at various reported locations,
variation of mean/variance throughput with time-of-day, etc.

Information based on this statistical characterization is provided to other mobiles to aid in their decision process Other mobiles query the server to obtain the statistical characteristics built up based on measurements reported by previous mobiles.

Information provided to a mobile can be "tuned" or "pruned" based on the mobile's reported location.

For example, at the mobile's reported location, the two wireless APs with the highest 80th percentile of the signal strength distribution are reported back to the mobile.

An example of how dynamic and statistical neighboring network information can be collected follows:

1. A local dynamic network information collector/analyzer (531) is used in the access network.
2. When a mobile terminal moves into the access network, it is asked to take measurements on the dynamic information such as the actual signal strength at its current location.
3. The mobile terminal sends the measurements to the local dynamic network information collector/analyzer (531).
4. The APs/BSs (521 and 522) in the access network also are asked to periodically report dynamic information such as their load to the local dynamic network information collector/analyzer (531).
5. The local dynamic network information collector/analyzer (531) processes the measurements from the mobile terminals and load reports from the APs/BSs (521 and 522) and builds dynamic neighboring network information.
6. The resultant dynamic network information may include things such as each AP/BS's actual signal strength at a given location, each AP/BS's averaged load at a given time of the day at a given location, etc.
7. The local dynamic network information collector/analyzer (531) sends updates to an MIIS server function (550).
8. The MIIS server (550) accepts and stores dynamic and statistical neighboring network information updates together with well-known static information.

An example follows showing how dynamic and statistical neighboring network information can help refine handover decisions (assuming that the mobile is making the decision):

1. At location {x, y}, 09:00 AM, the mobile (503) queries the MIIS (550) (via access network 2) for neighboring network info;
2. In response, MIIS (550) provides static, statistical/dynamic neighboring network information.
3. The static information indicates that 2 alternative BS/APs (521, 522) are present at location {x, y};
4. But the actual measurements recently collected indicate that BS/AP 521 is barely visible from location {x, y}. With this dynamic information the handover engine eliminates BS/AP 521 as a potential handover target.
5. Alternatively, the recently collected statistic information may indicate that BS/AP 521 tends to be overloaded from 08:25 to 11:37 every day. So the handover engine could avoid picking BS/AP 521 as the handover target on this basis even if the signal strength were sufficient.
6. At the end BS/AP 522 is picked as the best handover target.

One of skill in the art will appreciate that various modifications and changes may be made to the specific embodiments described above with respect to FIGS. 1-5 without departing from the spirit and scope of the present invention. Thus, the discussion of certain embodiments in greater detail above is to be regarded as illustrative and exemplary rather than restrictive or all-encompassing, and all such modifications to the specific embodiments described above are intended to be included within the scope of the present invention.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more. Unless otherwise indicated herein, the use of relational terms, if any, such as first and second, and the like, are used solely to distinguish one entity or action from another entity or action without necessarily requiring or implying any actual such relationship or order between such entities or actions.

The terms including and/or having, as used herein, are defined as comprising (i.e., open language). The term coupled, as used herein, is defined as connected, although not necessarily directly, and not necessarily mechanically. Terminology derived from the word "indicating" (e.g., "indicates" and "indication") is intended to encompass all the various techniques available for communicating or referencing the information or object being indicated. Some, but not all examples of techniques available for communicating or referencing the information or object being indicated include the conveyance of the information or object being indicated, the conveyance of an identifier of the information or object being indicated, the conveyance of information used to generate the information or object being indicated, the conveyance of some part or portion of the information or object being indicated, the conveyance of some derivation of the information or object being indicated, and the conveyance of some symbol representing the information or object being indicated. The terms program, computer program, and computer instructions, as used herein, are defined as a sequence of instructions designed for execution on a computer system. This sequence of instructions may include, but is not limited to, a subroutine, a function, a procedure, an object method, an object implementation, an executable application, an applet, a servlet, a shared library/dynamic load library, a source code, an object code and/or an assembly code.

What is claimed is:

1. A method for facilitating mobility between multiple communication networks comprising:
   collecting dynamic information at a local network device from mobile devices operating in a communication network using an access technology wherein the information corresponding to the mobile devices at different times during operation of the communication network, wherein dynamic information corresponding to each mobile device includes wireless measurement information and mobile device location;
   sending, to a neighboring network information server for access by at least one other communication network using a different access technology, the dynamic information collected and statistical information generated from the collected dynamic information;
   collecting additional dynamic information at the local network device from at least one wireless network nodes wherein the additional dynamic information indicates one of a loading level and a loading distribution that corresponds to the at least one wireless network node of the communication network for at least one of a particular time and a particular period of time;
   sending, to the neighboring network information server for access by at least one other communication network, the additional dynamic information collected and additional statistical information generated from the collected additional dynamic information; and
   using the dynamic neighboring network information, the statistical neighboring network information, the additional dynamic information and the additional statistical information by the at least one other communication network using a different access technology to improve a handover decision making from the communication network using an access technology to another communication network using a different access technology.

2. The method of claim 1, wherein collecting dynamic information corresponding to mobile devices at different times during operation of a communication network comprises collecting dynamic information corresponding to mobile devices when the mobile devices begin obtaining wireless network access via the communication network.

3. The method of claim 1, wherein dynamic information corresponding to each mobile device comprises at least one of:
   wireless signal strength measurements corresponding to at least one wireless network node,
   wireless signal quality measurements corresponding to at least one wireless network node, and throughput measurements corresponding to at least one wireless network node.

4. The method of claim 1, wherein statistical information generated from the dynamic information collected comprises at least one of:
   an indication of mean wireless signal strength at various locations corresponding to at least one wireless network node,
   an indication of the variance of wireless signal strength at various locations corresponding to at least one wireless network node,
   a probability distribution function of wireless signal strength at various locations corresponding to at least one wireless network node,
   an indication of mean throughput at various locations corresponding to at least one wireless network node,
   an indication of the variance of throughput at various locations corresponding to at least one wireless network node,
   a probability distribution function of throughput at various locations corresponding to at least one wireless network node,
   an indication of mean wireless signal strength at various times corresponding to at least one wireless network node,
   an indication of the variance of wireless signal strength at various times corresponding to at least one wireless network node,
   a probability distribution function of wireless signal strength at various times corresponding to at least one wireless network node,
   an indication of mean throughput at various times corresponding to at least one wireless network node,
   an indication of the variance of throughput at various times corresponding to at least one wireless network node, and
   a probability distribution function of throughput at various times corresponding to at least one wireless network node.

5. The method of claim 4, wherein statistical information generated from the additional dynamic information collected comprises at least one of:

an indication of an average loading level corresponding to at least one wireless network node of the communication network at a given time each day,
an indication of an average loading level corresponding to at least one wireless network node of the communication network at a given time each week,
an indication of an average loading level corresponding to at least one wireless network node of the communication network at a given time each month,
an indication of a mean loading level at various times corresponding to at least one wireless network node of the communication network,
an indication of the variance of loading level at various times corresponding to at least one wireless network node of the communication network, and
a probability distribution function of loading level at various times corresponding to at least one wireless network node of the communication network.

6. A method for facilitating mobility between multiple communication networks comprising:
receiving, by a neighboring network information server from each of multiple communication networks wherein one of the multiple communication networks using an access technology and another of the multiple communication networks using a different access technology,
dynamic information corresponding to one of mobile devices and the communication network from which the information is received;
statistical information corresponding to one of mobile devices and the communication network;
additional dynamic information corresponding to at least one wireless network node and
additional statistical information corresponding to the at least one wireless network node;
processing, by the neighboring network information server, the dynamic information, statistical information, additional dynamic information and additional statistical information;
receiving, by the neighboring network information server, a query from one of the multiple communication networks using an access technology for information that corresponds to a location and pertains to wireless network access via at least one neighboring communication network of the multiple communication networks using a different access technology;
sending, in response to the query, dynamic neighboring network information and statistical neighboring network information, wherein both dynamic neighboring network information and statistical neighboring network information are based on the processed dynamic information, statistical information, additional dynamic information and additional statistical information, wherein the dynamic neighboring network information and statistical neighboring network information used to improve a handover decision from one of the multiple communication networks using an access technology to at least one neighboring communication network of the multiple communication networks using a different access technology.

7. The method of claim 6, wherein the neighboring network information server comprises a media independent neighboring network information server.

8. The method of claim 6, further comprising generating at least one of dynamic neighboring network information and statistical neighboring network information from portions of the at least one of dynamic information and statistical information received that correspond to at least one of:
the location,
a present time of the day,
a present time of the week, and
a present time of the month.

9. The method of claim 6, wherein the dynamic information comprises at least one of:
wireless signal strength measurements corresponding to at least one wireless network node,
wireless signal quality measurements corresponding to at least one wireless network node, and
throughput measurements corresponding to at least one wireless network node.

10. The method of claim 6, wherein the statistical information comprises at least one of:
an indication of mean wireless signal strength at various locations corresponding to at least one wireless network node,
an indication of the variance of wireless signal strength at various locations corresponding to at least one wireless network node,
a probability distribution function of wireless signal strength at various locations corresponding to at least one wireless network node,
an indication of mean throughput at various locations corresponding to at least one wireless network node,
an indication of the variance of throughput at various locations corresponding to at least one wireless network node,
a probability distribution function of throughput at various locations corresponding to at least one wireless network node,
an indication of mean wireless signal strength at various times corresponding to at least one wireless network node,
an indication of the variance of wireless signal strength at various times corresponding to at least one wireless network node,
a probability distribution function of wireless signal strength at various times corresponding to at least one wireless network node,
an indication of mean throughput at various times corresponding to at least one wireless network node,
an indication of the variance of throughput at various times corresponding to at least one wireless network node,
a probability distribution function of throughput at various times corresponding to at least one wireless network node,
an indication of an average loading level corresponding to at least one wireless network node of the communication network at a given time each day,
an indication of an average loading level corresponding to at least one wireless network node of the communication network at a given time each week,
an indication of an average loading level corresponding to at least one wireless network node of the communication network at a given time each month,
an indication of a mean loading level at various times corresponding to at least one wireless network node of the communication network,
an indication of the variance of loading level at various times corresponding to at least one wireless network node of the communication network, and
a probability distribution function of loading level at various times corresponding to at least one wireless network node of the communication network.

11. A method for facilitating mobility between multiple communication networks comprising:

querying, from a communication network using an access technology, a neighboring network information server for information that corresponds to a location and pertains to wireless network access via at least one neighboring communication network using a different access technology;

receiving, in response to the querying, dynamic neighboring network information and statistical neighboring network information, wherein both dynamic neighboring network information and statistical neighboring network information are based on a history of wireless measurements that correspond to the location and wherein the wireless measurements include dynamic information and statistical information from wireless devices operating in at least one neighboring communication network and the wireless measurements include additional dynamic information and additional statistical information from wireless network nodes operating in at least one neighboring communication network, and wherein both the dynamic neighboring network information and the statistical neighboring information are processed dynamic information, statistical information, additional dynamic information and additional statistical information;

using the dynamic neighboring network information and statistical neighboring network information to improve a handover decision from the communication network using an access technology to a neighboring communication network using a different access technology.

12. The method of claim 11, wherein at least one of dynamic neighboring network information and statistical neighboring network information are further based on a history of loading levels corresponding to at least one wireless network node.

* * * * *